United States Patent [19]

Hide

[11] Patent Number: 4,553,919

[45] Date of Patent: Nov. 19, 1985

[54] APPARATUS FOR PRODUCING POLYACETYLENE FILM

[75] Inventor: Ichiro Hide, Sapporo, Japan

[73] Assignee: Hoxan Corporation, Sapporo, Japan

[21] Appl. No.: 646,308

[22] Filed: Aug. 31, 1984

[30] Foreign Application Priority Data

Aug. 31, 1983 [JP] Japan .......................... 58-134887[U]

[51] Int. Cl.$^4$ .................... B29C 13/00; B29C 23/00
[52] U.S. Cl. ...................................... 425/90; 422/131; 526/88; 425/225
[58] Field of Search ................. 425/225, 90; 422/131; 526/88

[56] References Cited

U.S. PATENT DOCUMENTS

| | | | |
|---|---|---|---|
| T864,005 | 7/1965 | McSpadden et al. | 422/131 |
| 1,679,093 | 7/1928 | Miller et al. | 526/88 |
| 3,188,306 | 6/1965 | Porter | 526/88 |
| 3,407,046 | 10/1968 | Massoubre | 526/88 |
| 4,370,302 | 1/1983 | Suzuoka et al. | 422/131 |

*Primary Examiner*—Willard E. Hoag
*Attorney, Agent, or Firm*—Schwartz, Jeffery, Schwaab, Mack, Blumenthal & Evans

[57] ABSTRACT

An apparatus for producing a polyacetylene film by polymerizing acetylene gas in contact with Ziegler-Natta catalyst comprising in a vessel to be introduced with acetylene gas a rotatably driven film forming drum, a coating member for coating the Ziegler-Natta catalyst on the outer peripheral surface of the drum, a feeding roller driven reversely to the drum in rolling contact with the drum for drawing a polyacetylene film polymerized with the catalyst on the drum, a cleaning member for cleaning the drawn polyacetylene film, and a winding unit for winding the polyacetylene film. Thus, the polyacetylene film can be produced in high quality in a mass production.

3 Claims, 4 Drawing Figures

APPARATUS FOR PRODUCING POLYACETYLENE FILM

BACKGROUND OF THE INVENTION

This invention relates to an apparatus for continuously producing a polyacetylene film by Ziegler-Natta catalyst.

A polyacetylene is the most simple chain conjugated high-molecular compound which contains as ingredients a carbon atom and a hydrogen atom, and has properties as a semiconductor. Particularly, a polyacetylene membrane which is laminated with Ziegler-Natta catalyst (Ti(OC—H—)—Al(C—H—) series) has fibril (fibrous ultrafine crystal) mesh structure of approx. 200 A in diameter. When this membrane slightly doped with halogen gas or arsenic pentafluoride, its conductivity can be largely varied.

Since such a polyacetylene membrane has extremely chemical stability, a light weight and a fibril mesh structure, resulting in a large surface area, the polyacetylene membrane has already noted as favorable electrode materials for a secondary battery or applications for integrated circuits.

In order to produce the above-described polyacetylene film, it was heretofore known to produce the polyacetylene film by the method which has the steps of preparing the molar ratio of aluminum/titanium of the Ziegler-Natta catalyst to 4 to 4, and cooling the catalyst at $-78°$ C. with a refrigerant of a dry ice methanol, blowing acetylene gas to the catalyst, thereby polymerizing the gas in the vicinity of the boundary between the vapor phase and the liquid phase in the surface of the catalyst solution.

When the polyacetylene film is heretofore actually produced, a substrate b made, for example, of glass is contained, as shown in FIG. 1, in a vessel a, the Ziegler-Natta catalyst is coated on the surface of the substrate b, acetylene gas introduced via a supply tube c into the vessel a is blowed to the substrate b, thereby polymerizing to produce the polyacetylene film d of the same shape as the substrate b. Reference character e in FIG. 1 designates an acetylene gas exhaust tube.

In the conventional case, the substrate b must be, however, exchanged whenever the film is produced in a troublesome manner, and the polyacetylene film thus produced is limited in thickness and area, resulting in a difficulty in the low productivity.

In order to improve the productivity of the polyacetylene film, it is considered to, for example, store Ziegler-Natta catalyst in a coverless vessel, polymerize acetylene gas in the vicinity of the boundary between the vapor phase and the liquid phase in the surface of the catalyst, and thus continuously draw the polyacetylene film thus formed. In this case, it is not only difficult to smoothly draw the polyacetylene film, but also excessive catalyst is adhered to the produced polyacetylene film. Accordingly, even if the film is cleaned, the catalyst is not completely removed, and disadvantageously affects the adverse influence to the characteristics of the produced film.

SUMMARY OF THE INVENTION

Accordingly, it is an object of this invention to provide an apparatus for producing a polyacetylene film which can eliminate the aforementioned drawbacks and disadvantages and can facilitate a mass production and produce a polyacetylene of high quality.

The above and other related objects and features of the invention will be apparent from a reading of the following description of the disclosure found in the accompanying drawings and the novelty thereof pointed out in the appended claims.

BRIEF DESCRIPTIONS OF THE DRAWINGS

DESCRIPTION OF THE PREFERRED EMBODIMENTS

The present invention will now be described in more detail with reference to the accompanying drawings.

Figure 1A:
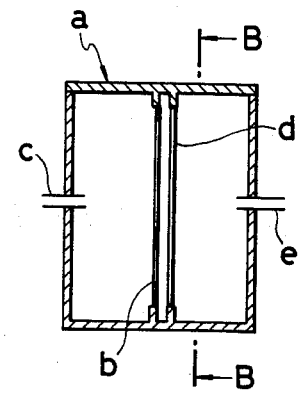
FIG. 1(a) is a schematic vertical sectional front view showing a conventional apparatus for producing a polyacetylene film.
Figure 1B:
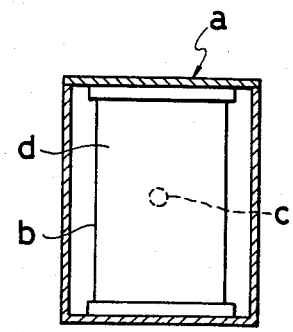
FIG. 1(b) is a sectional view taken along the line B—B in FIG. 1(a) as seen in a direction of arrows B.
Figure 2:
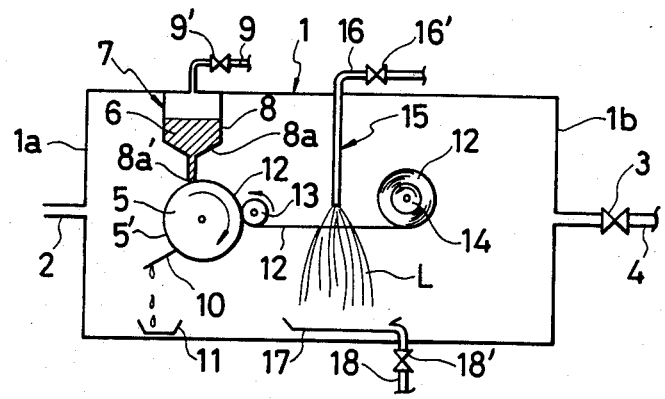
FIG. 2 is an explanatory view showing a first embodiment of an apparatus for producing a polyacetylene film according to the present invention.

In FIG. 2, reference numeral 1 designates a vessel formed in a box shape. Acetylene gas is freely introduced from a supply conduit 2 connected to one side wall 1a of the vessel 1, and an exhaust conduit 4 of the same gas having a switching control valve 3 is connected to the other side wall 1b of the vessel 1. The pressure of the acetylene gas introduced into the vessel 1 is maintained constantly by controlling to open or close the valve 3.

The valve 3 may employ a diaphragm valve which operates to open or close under a predetermined constant pressure, or may also use a solenoid valve which is controlled to be opened or closed by a signal from a detector separately provided for detecting the pressure of the gas in the vessel 1.

A drum 6 for producing a film of a predetermined width is provided rotatably by a rotary drive mechanism, not shown, at the side of the supply conduit 2 in the vessel 1. A coating member 7 for coating Ziegler-Natta catalyst 6 is arranged on the outer peripheral surface 5' of the drum 5.

The member 7, exemplified in the drawings, is of the type of a container 8 for storing the Ziegler-Natta catalyst 6. A convergent flow-down unit Ba is formed at the lower end of the container 8, and an outlet 8a' opened in a slit shape is opened at the lower end over the entire width of the drum 5 to coat the catalyst 6 flowed down from the outlet 8a' on the outer peripheral surface 5' of the drum 5. Inert gas is supplied and sealed via a conduit 9 having an opening and closing control valve 9' from the exterior of the container into the vapor phase section in the container 8. Reference numerals 10 and 11 respectively designate a wiper for removing the excessive catalyst 6 on the drum 6 and a tray for receiving the catalyst 6 flowed down from the wiper 10.

A feeding roller 13 for drawing the polyacetylene film 12 from the outer peripheral surface 5' of the drum 5 is rolled in contact with the outer peripheral surface 5' in case that the film 12 is formed on the outer peripheral surface 5' as will be described in more detail in such a manner to be reversely driven to the drum 5. A winding unit 14 by a roller is rotatably arranged in parallel with the drum 5 for winding the polyacetylene film 12 at the exhaust conduit 4 side in the vessel 1.

A cleaning member 15 is provided between the roller 13 and the winding unit 14 for cleaning and removing the Ziegler-Natta catalyst adhered onto the film 12, and is composed of a cleanser supply conduit 16 arranged through an opening and closing control valve 16′ from the exterior of the vessel 1. Cleanser L such as toluene is injected and flowed down from the conduit 16 to clean the film 12, and the cleanser is flowed into a tray 17 provided on the bottom of the vessel 1, and exhausted externally via a conduit 18 having an opening and closing control valve 18′.

In operation for producing the polyacetylene film by using the apparatus thus constructed as described above, acetylene gas is introduced via the supply conduit 2 into the vessel 1 under a predetermined pressure, the drum 6 is rotatably driven, and Ziegler-Natta catalyst 6 is flowed down from the outlet 8a′ of the flow-down unit 8a onto the outer peripheral surface 5′ of the drum 5 and the coated on the outer peripheral surface 5′.

In this case, the drum 5 may, for example, have a length of 20 to 50 cm and takes approx. 10 to 20 min at the rotating speed to rotate the drum 5 from the outlet 8a′ of the flow-down unit 8a to the roller 13.

As described above, the acetylene gas is polymerized by the catalyst 6 onto the outer peripheral surface 5′ of the drum 5 to produce the polyacetylene film 12. The film 12 is removed by the rotations of the drum 5 and the roller 13, then wound on the winding unit 14, and the Ziegler-Natta catalyst 6 adhered to the film 12 is cleaned and removed by the cleanser L injected and flowed down from the supply conduit 16 in the meantime.

Figure 3:
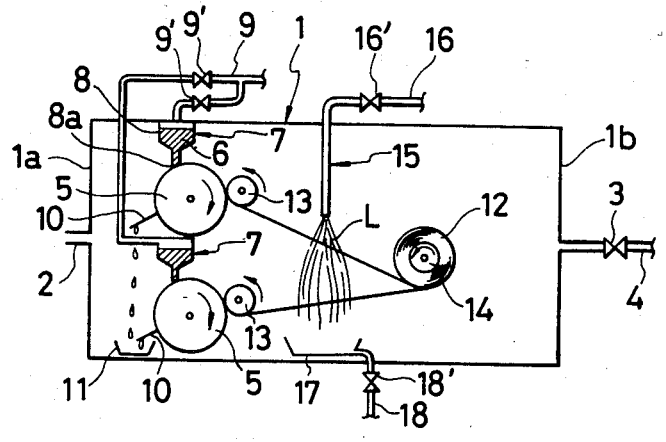
FIG. 3 is an explanatory view showing another embodiment of the apparatus of the invention.

FIG. 3 shows another embodiment of an apparatus for producing a polyacetylene film according to the present invention. This embodiment is different from the first embodiment of the invention at the points that drums 5 are provided in multiple stages at the supply conduit 2 side in a vessel 1 and a plurality of polyacetylene films 12 can be wound on a winding unit 14 in the laminated state. In the embodiment exemplified in FIG. 3, two drums 5 are provided at the upper and lower stages, two coating members 7 and feeding rollers 13 are correspondingly provided for the two drums 5, and double layer polyacethylene films 12, 12 are wound on the winding unit 14.

In this case, the wiper 10 scrapes the catalyst 6 remaining on the outer peripheral surface 5′ of the drum 5 and flows down the catalyst to a tray 11. Thus, the catalyst 6 supplied from the container 8 to the outer peripheral surface 5′ of the drum 5 is not unintentionally excessively increased.

According to the present invention as described above, since there is provided an apparatus for producing a polyacetylene film 12 by polymerizing acetylene gas in contact with Ziegler-Natta catalyst 6 which comprises in a vessel 1 to be introduced with acetylene gas a rotatably driven film forming drum 5, a coating member 7 for coating the Ziegler-Natta catalyst 6 on the outer peripheral surface 5′ of the drum 5, a feeding roller 13 driven reversely to the drum 5 in rolling contact with the drum 5 for drawing a polyacetylene film 12 polymerized with the catalyst 6 on the drum 5, a cleaning member 17 for cleaning the drawn polyacetylene film 12, and a winding unit 14 for winding the polyacetylene film 12, the polyacetylene film 12 can be continuously produced with good productivity, and since the Ziegler-Natta 6 is coated on the drum 5, the polyacetylene film 12 of high quality can be produced by supplying the suitable quantity of the catalyst 6.

What is claimed is:

1. An apparatus for producing a polyacetylene film by polymerizing acetylene gas in contact with Ziegler-Natta catalyst comprising: in a vessel to be introduced with acetylene gas
    a rotatably driven film forming drum,
    a coating member for coating the Ziegler-Natta catalyst on the outer peripheral surface of the drum,
    a feeding roller driven reversely to the drum in rolling contact with the drum for drawing a polyacetylene film polymerized with the catalyst on the drum,
    a cleaning member for cleaning the drawn polyacetylene film, and
    a winding unit for winding the polyacetylene film.

2. The apparatus according to claim 1, wherein said coating member is of the type of a container for storing the Ziegler-Natta catalyst.

3. The apparatus according to claim 1, further comprising a wiper for removing the excessive catalyst on said drum and a tray for receiving the catalyst flowed down from said wiper.

* * * * *